United States Patent [19]

Blood et al.

[11] Patent Number: 4,912,755

[45] Date of Patent: Mar. 27, 1990

[54] LINE CURRENT TEST DEVICE

[75] Inventors: Dennis C. Blood, North St. Paul; David L. Ingalsbe, Hastings, both of Minn.

[73] Assignee: Independent Technologies, Inc., Omaha, Nebr.

[21] Appl. No.: 399,269

[22] Filed: Aug. 28, 1989

[51] Int. Cl.[4] .......................... H04M 1/24; H04B 3/46
[52] U.S. Cl. .......................................... 379/6; 379/21; 379/27; 379/32
[58] Field of Search .......................... 379/21, 6, 27, 32

[56] References Cited

U.S. PATENT DOCUMENTS

| | | | |
|---|---|---|---|
| 3,870,836 | 3/1975 | Kusama | 379/21 |
| 3,912,882 | 10/1975 | Beerbaum | 179/175.3 R |
| 4,022,987 | 5/1977 | O'Dea | 179/175 |
| 4,513,179 | 4/1985 | Phillips et al. | 179/175.3 R |
| 4,536,703 | 8/1985 | Jablway | 324/52 |
| 4,825,458 | 4/1989 | Dash | 329/32 X |

*Primary Examiner*—Stafford D. Schreyer
*Attorney, Agent, or Firm*—Anthony G. Eggink; Joel D. Skinner, Jr.

[57] ABSTRACT

A compact, unitary test device for use with telephone line conductors connected to customer premises telephone equipment comprises a first test circuit for terminating the conductors of the telephone line and for measuring current therein. The device also comprises a second test circuit for measuring current in the line conductors in series with the customer premises equipment during operation. A third test circuit provides a tone signal of a predetermined frequency to the line conductors. The test device has a switch set, a current measurement section, a resistance section, a tone generator and a power source. Further provided is a method of testing a telephone loop by measuring loop current level from a terminated position and in series with operative customer premises equipment. A tone signal is generated at a first predetermined point on the line conductors for reception at a second predetermined point.

20 Claims, 4 Drawing Sheets

LINE CURRENT TEST DEVICE

BACKGROUND OF THE INVENTION

This invention relates to electronic test devices and more particularly to test devices used in the telecommunications industry. The device of this invention is particularly useful for determining the current level and continuity in telephone loops.

A typical telephone loop or line consists of a pair of wires or conductors that provide a circuit or transmission path between the telephone company central office (C.O.) and the customer or subscriber premises. The loop allows the transmission of voice and data signals between telecommunications equipment at the central office, and customer premises equipment such as telephone handsets, PBX equipment, KEY equipment, computers, and facsimile equipment. Properly operating telephone loops have between approximately 23 milliamps and 35 milliamps of current. Less than 23 milliamps of line current may cause poor signal transmission, ghost rings, wrong numbers or other problems. More than 35 milliamps may cause problems such as cutoffs, burn-out of telephone equipment circuits, "squeal" or "hollow" sounds on the line, or other malfunctions.

The telephone loop extends form the central office to the customer premises where it typically terminates at an interface terminal or block which has multiple connectors for hook-up of the above-described customer equipment. Alternatively, the terminal may have a modular connector such as a plug or jack. The terminal serves as a demarcation point at which maintenance responsibility is divided; the telephone company having responsibility for maintenance of hardware from the terminal to the central office, and the customer having responsibility from the terminal to the customer equipment. Test equipment which determines the condition of the loop and the customer equipment is typically connected directly at the terminal.

Presently, telephone company personnel commonly test loops for continuity using, for example, an analog or digital multimeter. However, the expansion of telecommunication networks and their increased use for data transmission has resulted in complex loop interconnect wiring installations at interface terminals. And, testing such installations via a multimeter or the like is very time consuming and does not lend itself to an established procedure for technicians to follow. Also, such prior art techniques usually require two technicians using two meter devices or the like. Further, some test devices are incapable of testing both loop continuity and current level or are otherwise limited in use.

Thus, there has arisen a need in the telecommunications industry for a unitary apparatus and method of testing which simplify the proper identification and evaluation of telephone loops on a broad range of telecommunication systems. Despite the need for a test device and method which overcome the limitations and problems of the prior art, none insofar as is known have been proposed or developed.

SUMMARY OF THE INVENTION

The present invention provides a compact, unitary test device for use with telephone loop or line conductors which are connected to customer premises equipment. The device comprises a first test circuit or path for terminating the conductors of the telephone line and for measuring current therein. The first test circuit establishes a current path between the conductors through circuit activation means, current measurement and display means, and resistance means. A second test circuit measures current in the line conductors in serees with the customer premises equipment during operation. The second test circuit establishes a current path in series with the line conductors and the customer premises equipment through the current measurement and display means, and the circuit activation means. A third test circuit provides a tone signal of a predetermined frequency to the line conductors. The third test circuit establishes a current path between the line conductors through the circuit activation means, tone generation means, and a power source.

The current measurement and display means comprises a bridge circuit connected to the circuit activation means and to an LCD display. The circuit activation means allows the user to select a test circuit and comprises a switch set, including a first switch, a second switch and at least one termination switch connected with the current measurement means. The resistance means comprises series resistors which are selectively connectable via the termination switch to vary the total resistance value of the resistance means. The tone generation means comprises a pair of tone generators, each generating an oscillating tone of a predetermined frequency varying from the other.

The first test circuit establishes a current path through the first switch and the termination switch, the second test circuit establishes a current path through the first and the second switches, and the third test circuit establishes a current path through the first switch. The first test circuit further includes a ground-start switch which temporarily establishes a current path from one line conductor to ground.

A method of testing a telephone loop having pairs of conductors comprises the steps of measuring loop current level from a terminated position by establishing a current path between two loop conductors through a test circuit, and measuring loop current level in series with operative customer premises equipment by establishing a current path through the test circuit, in series with the loop conductors and the customer premises equipment. A tone signal may further be generated at a first predetermined point on the loop conductors for reception at a second predetermined point.

These and other benefits of this invention will become clear from the following description by reference to the drawings.

DESCRIPTION OF THE PREFERRED EMBODIMENT

The Line Current Test Device of the present invention provides a compact, hand-holdable, self-powered, unitary device which tests a telephone loop or circuit for normal circuit operating conditions. The device provides circuitry for three basic methods of testing a loop in a single, unitary device. The first test, or Termination Test, directly terminates the telephone loop or line and measures current from the central office. This test is typically used to check lines prior to the installation of new customer premises telephone equipment. It may also be used to verify continuity in the central office line during a service call on existing customer premises equipment. The second test, or In-Line Test, measures current in the loop when it is connected with customer premises equipment during operation. The In-Line Test is typically made subsequent to the Termination Test, and on either new or existing telephone installations. In-line loop current may vary from that of a terminated loop due to differences in customer premises equipment. The third test, or Tone Test, provides an audible tone of a predetermined frequency to the line conductors at one location in the loop, which enables a telephone technician to identify and locate the same conductors at another location and trouble shoot line problems.

Figure 1:
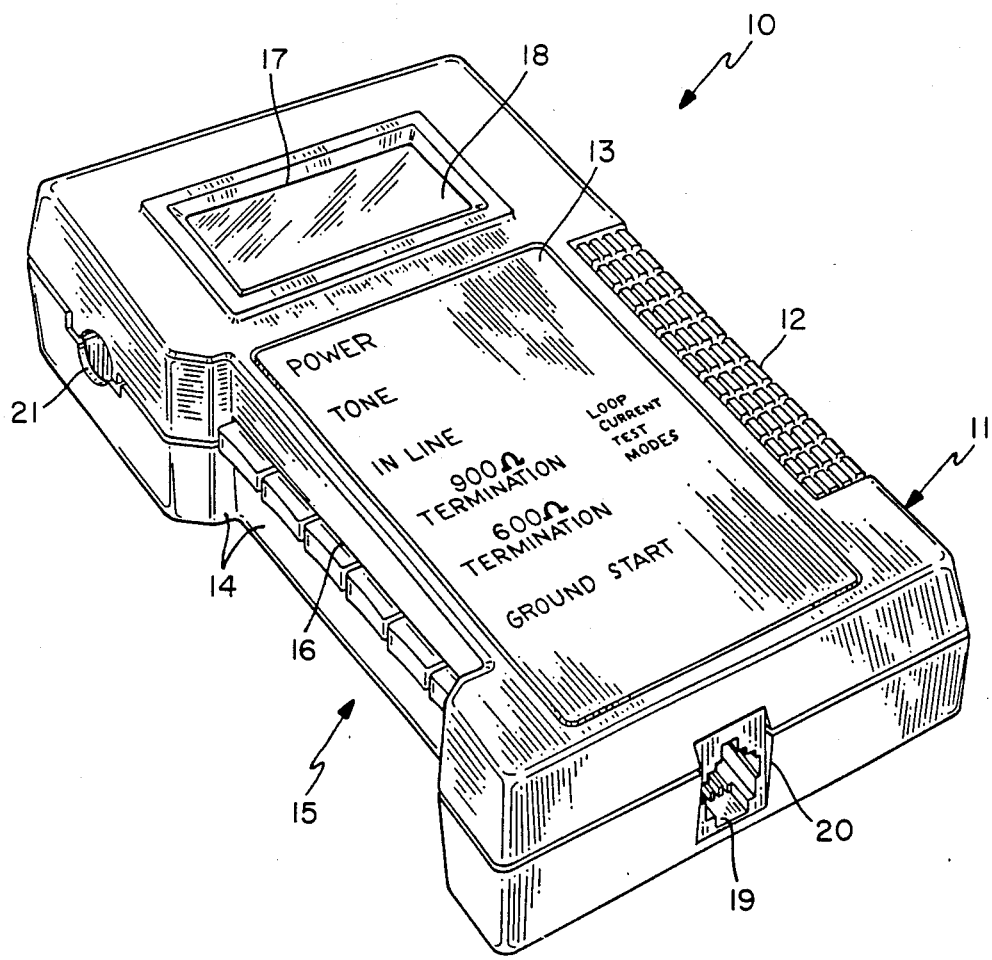
FIG. 1 is perspective view of the Line Current Test Device of the present invention.

Referring to FIG. 1, the Line Current Test Device 10 has a compact, hand-holdable housing 11. The generally rectangular housing 11 is preferably constructed of a lightweight, high-strength material such as plastic or the like. The housing 11 is shown to have a knurled grip surface 12 on portions of one side and the back of the housing 11 for improved gripping and handing by a technician. The housing 11 also has a flat face portion 13 on its top and an indented or recessed area 14 located on the side opposite the grip surface 12. The flat face 13 is shown to be labeled with indications of device 10 functions. The recessed area 14 of the housing 11 partially encloses a set of function keys or switches 15 which extend from the interior of the housing 11 through an aperture 16. The housing 11 further has a rectangular aperture 17 disposed on its top surface which exposes an internally located liquid crystal diode (LCD) display 18 for viewing. A modular jack 19 is also exposed for connection, via an aperture 20, which is shown located at the bottom end of the device 10. An aperture 21 is shown to be located on a side of the housing 11 to expose a circuit breaker switch (not shown) as described below.

Figure 2:
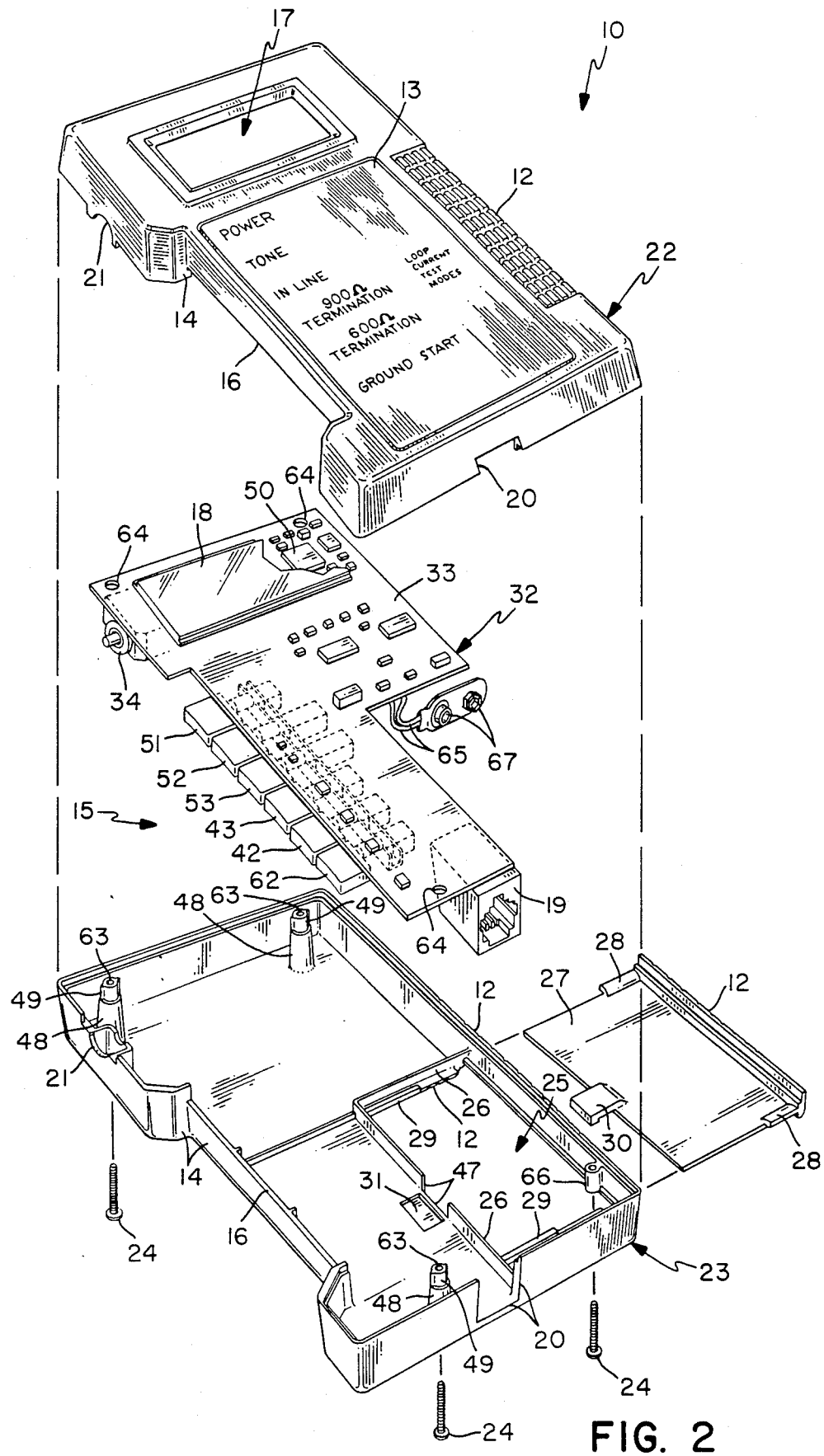
FIG. 2 is an exploded perspective view of the device showing various components of its circuitry.

Referring also to FIG. 2, the housing 11 is shown to be comprised of a top portion 22 and complementary bottom portion 23 which are connectable via screws 24 or similar fasteners. This two-piece configuration provides economy of manufacture as well as ease of access to the internal circuitry of the device 10.

The bottom portion 23 is shown to have a rectangular battery aperture 25 located in a corner area, which allows a standard 9 volt transistor battery (not shown) to be inserted within the interior of the housing 11. Preferably, a retaining edge 26 is inwardly disposed about the periphery of the battery aperture 25 to horizontally stabilize and hold the battery. A slidable battery cover 27 is connectible to the housing 11 to cover and seal the battery aperture 25 once the battery is in place, and which may be disconnected from the housing 11 for battery replacement. Attachment lips 28 are shown disposed on the battery cover 27 interior side to slidably mate with attachment edges 29 located on the battery aperture 25 periphery. Additionally, the battery cover 27 has a snap extension 30 which mates with a snap depression 31 located on the interior of the bottom portion 23 to secure the cover 27 in a closed position over the battery aperture 25. The retaining edge 26 has a passage 47 through which the snap extension 30 is inserted to mate with the snap depression 31.

The bottom portion 23 of the housing structure 11 is shown to have generally cylindrically shaped support post structures 48 disposed on its interior side at three corner locations to support a printed circuit board (PCB) 33 in a raised position off the floor of the bottom portion 23. The support posts have hollow centers 63, through which connection screws 24 extend, and tapered top portions 49 which mate with apertures 64 in the PCB 33. Additionally, a connection sleeve 66 is show connected to the bottom portion 23 interior side, proximate the battery aperture 25, and which also retains a connecting screw 24.

FIG. 2 further shows the basic circuitry 32 of the device 10 and its orientation within the housing 11. The circuitry 32 generally includes the array of switches 15, the LCD display 18 and the modular jack 19, each being configured on the PCB 33 so that they align with their respective apertures 16, 17 and 20, as described above. A circuit breaker 34, of approximately 80–100 milliamps is conductively connected to the PCB 33 and aligned with the circuit breaker aperture 21. A 2-pin, 9 volt battery connection terminal 67 is connected to the conduction network of the PCB 33 via a pair of insulated conductors 65, to supply power from the battery. A detailed description of these components and additional circuit elements, and their interconnection and behavior in the overall circuit 32 is provided below.

Figure 3:
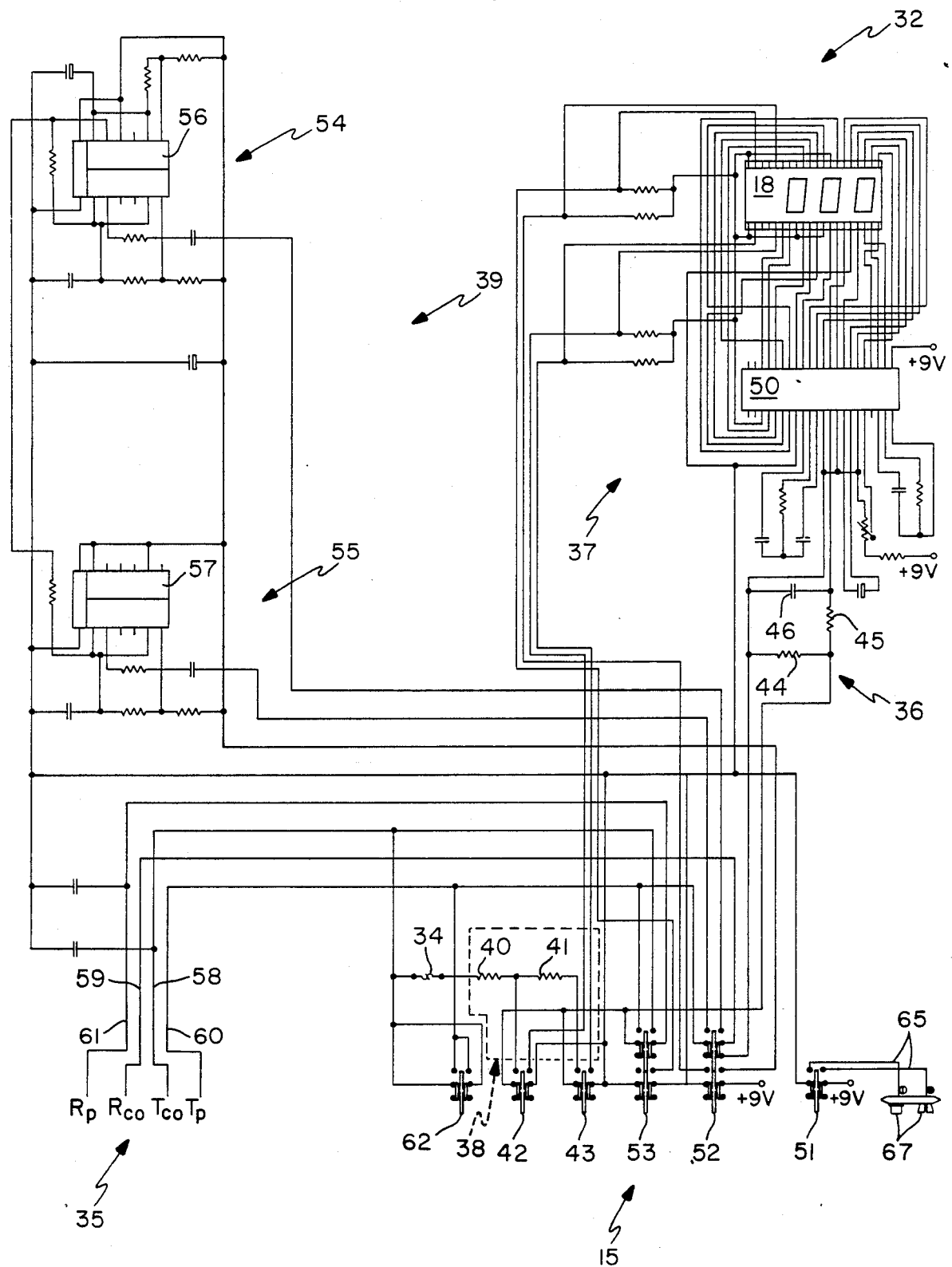
FIG. 3 is a schematic diagram of the circuitry.

Referring to FIG. 3, the circuit elements 32 of the device 10 and their interconnection are shown in a schematic diagram form. The circuit 32 comprises specific component groups or sections which are selectively activated by the technician via the push button switch set 15. The component sections include a current measurement circuit 36, a display circuit 37, a variable resistance circuit 38, and a tone generation circuit 39. The switch set 15 activates or brings selected component groups into a cooperative circuit connection with each other and with predetermined conductors 58, 59, 60 and 61 of an input/output terminal 35, which connects to predetermined central office line and equipment conductors $T_{co}$, $R_{co}$, $T_p$ and $R_p$. The first through fourth conductors or terminals 58–61 are preferably connected to the modular jack 19, shown in Figs. 1 and 2, or other connection means. The modular jack 19 accepts a modular plug, for example used to terminate a central office line, thereby allowing quick and accurate connection. Alternatively, an adapter cable set (not shown) having a modular plug may be mated with the modular jack 19. An exemplary cable set has four leads with color coded alligator-type clips, or the like, for connection to the individual central office line or premises equipment conductors $T_{co}$, $R_{co}$, $T_p$ and $R_p$.

These basic component groups of the circuit 32 cooperate in a selected manner via the switch set 15 to yield three distinct functional circuit paths. The first circuit path or Termination path terminates the conductors of the central office telephone line and measures current therein. The Termination path is utilized on a new telephone installation, prior to connection of new premises telephone equipment to determine the level of current in the conductors from the central office. Another application of the Termination path is to disconnect existing premises equipment from the central office line and subsequently check the line current level. The Termination path establishes a current path between the Tip and Ring conductors of the central office line through the switch set 15, the resistance section 38, and the current measurement section 36, whereby the current level is displayed via the display section 37. Specifically, the Terminaton path first runs from the Tip or positive conductor of the central office line ($T_{co}$) through the circuit breaker 34 and then to the variable resistance section 38.

The variable resistance section 38 is shown to comprise two series connected resistors 40 (approximately 400 ohm) and 41 (approximately 300 ohm) which are connected to two termination switches 42 and 43. The switches 42 and 43 are preferably double pole, double throw push button switches which are connected and arranged so that a current path is formed through both resistors 40 and 41 when the 900 ohm termination switch 43 is depressed, and so that resistor 41 is bypassed or removed from the current path when the 600 ohm termination switch 42 is depressed. The circuit breaker 34 contributes a resistance of approximately 150 ohms to the series circuit through the resistors 40 and 41, so the total resistance resulting from the operation of the termination switches 42 or 43 are approximately 600 and 900 ohms, respectively. Alternative resistance values may be utilized consistent with the teachings of the invention so long as they yield a termination resistance of approximately 400 to 900 ohms.

The Termination path further extends from either the 600 ohm termination switch 42 or the 900 ohm termination switch 43, as described above, to the current measurement section 36. The current measurement section 36 is shown to be a bridge or shunt circuit comprising resistors 44 and 45, and a capacitor 46, as known in the art. The current measurement section 36 is connected to a display section 37 which comprises an LCD display driver 50 and the LCD display 18. The LCD display driver 50 is, for example, an analog to digital converter integrated circuit manufactured by National Semiconductor Corporation. These display components receive power from a 9 volt battery through a double pole, double throw power switch 51 and through a corresponding termination switch 42 or 43, as shown. Also, the configuration of the display section 37 and its connection to the termination switches 42 and 43, provide a visual indication of the circuit pathway selected through utilization of either termination switch 42 or 43, whereby either 600 ohm or 900 ohm termination status is displayed via the LCD display 18. The Termination path extends from the current measurement section 36 to a first or tone/loop switch 52, and then to the Ring or negative conductor ($R_{co}$) of the central office line. The first switch 52 is preferably a four pole, double throw switch which completes the aforesaid Termination path when it is in a non-depressed (loop) position.

The second circuit path or In-Line path is for measuring current in predetermined line conductors in series with the customer premises equipment while the equipment is in an operating or "off-hook" condition. The In-Line path may be utilized on new or existing telephone installations, preferably subsequent to the Termination test. The In-Line path establishes a current path in series with the Tip and Ring central office line conductors ($T_{co}$) and ($R_{co}$) and with the Tip and Ring premises equipment conductors ($T_p$) and ($R_p$) through the current measurement section 36 and the switch set 15. Specifically, the In-Line path runs from the Tip conductor of the central office line ($T_{co}$) to a second or In-Line switch 53 and then to the Ring conductor of the premises equipment line ($R_p$) via the input terminals 35.

The current path then extends through the circuitry of the premises equipment (not shown) while it is in an "off-hook" or closed circuit condition as is known in the art, and to the Tip conductor of the premises equipment line ($T_p$). Again via the input terminal 35, the In-Line current path extends to the second switch 53, current measurement section 36, first switch 52, and to the Ring conductor of the central office line ($R_{co}$), consecutively. In this configuration, the first switch 52 is in its non-depressed (loop) condition. The second switch 53 is a four pole, double throw switch, which is in a depressed or activated condition in the In-Line path. Also in this configuration, the second switch is further included in the power path between the battery and the display section 37 such that the LCD display 18 visually indicates In-Line test status.

The third or Tone circuit path provides a tone signal of a predetermined in-band frequency to a predetermined pair of line conductors for use in wire identification and fault location. The Tone path may also be utilized on either new or existing telephone installations, and either alone or in conjunction with the Termination or In-Line tests. The tone signal is generated at any point in a loop, as described in detail below, for example, at an interface terminal. The tone signal may then be detected by a technician at another point in the loop, for example, utilizing a standard telephone handset, thereby verifying the conductor constituents of the loop. The Tone path establishes a current path between the pair of line conductors through the first switch 52 of switch set 15, the tone generation section 39, and the 9 volt battery power source. The tone generation section 39 provides a continuously varying, audibly perceptible, dual interrupted tone of in-band frequencies. As shown, there are two tone generators 54 and 55 which provide two tones (of differing frequencies) so that two loops may be tested simultaneously. The first tone generator 54 produces an oscillating or warble tone of a relatively low in-band frequency, and the second tone generator 55 produces a tone of a relatively higher frequency. Tone generators 54 and 55 are shown to comprise dual timer integrated circuits 56 and 57, respectively, and associated resistances and capacitances. Such integrated circuit 56 and 57 are manufactured, for example, by National Semiconductor Corporation. The tone generators 54 and 55 preferably generate oscillating or warble tone signals so as to avoid potential confusion with audible signals generated by data or alarm circuits which may be present on the same loop. The tones may be generated simultaneously without degradation of tone quality.

As shown, the tone section 39 is connected to the battery via the power switch 51, and to the first and fourth terminals 58 and 61. The first tone generator 54 is connected to the second terminal 59 via the first switch 52, and the second tone generator 55 is connected to the third terminal 60, also via the first switch 52. Hence, the low frequency tone is supplied via the second terminal 59, and the high frequency tone is supplied via the third terminal 60. The above mentioned connections are established when the respective power and first switches 51 and 52 are in their depressed (power and tone) modes. Also, via the power switch 51 and the first switch 52, the display section 31 is operatively connected to the battery so that the LCD display 18 visually indicates a tone test status.

The device 10 circuitry 32 further provides a means of testing ground-start telephone systems, which require that a temporary connection be made between the Tip conductor of the central office line and a local ground. The ground connection is recognized by central office equipment as an indication of premises equipment operation, thereby activating certain functions of the central office equipment as known in the art.

As shown, the ground-start circuit establishes a current path between the central office line Tip conductor ($T_{co}$) (via first terminal 58) and the local ground (via the third terminal 60), through a double pole, double throw ground-start switch 62. The ground-start switch 62 is non-latching and releasable so that the switch 62 is operated only while being depressed by the technician, thereby yielding a temporary connection to ground.

With respect to the function of the remaining switches 51, 52, 53, 43 and 42, the power switch 51 is a latchable switch so that power may be continuously provided during testing. The first, second, 900 ohm termination, and 600 ohm termination switches 52, 53, 43 and 42 are similarly latchable for continuous depression. Additionally, these four test mode switches 52, 53, 43 and 42 are mechanically linked, as known in the art, so that as any one of such switches are engaged or latched, the remaining switches are automatically disengaged or unlatched.

Figure 5:
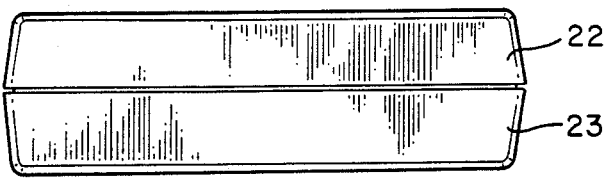
FIGS. 4-8 are frontal views of the exterior of the device.
Figure 8:
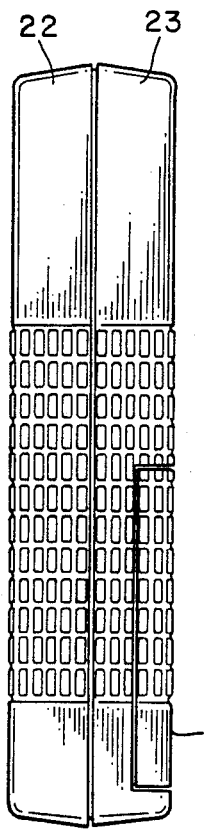
Figure 4:
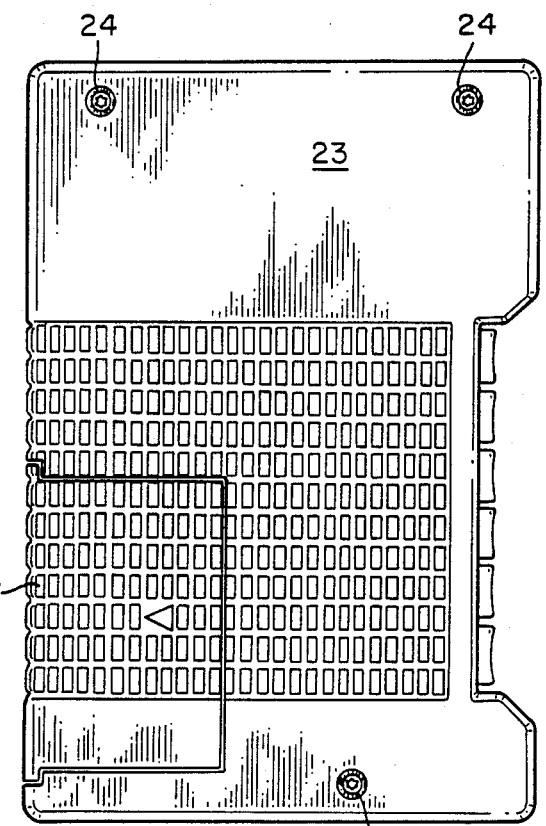
Figure 6:
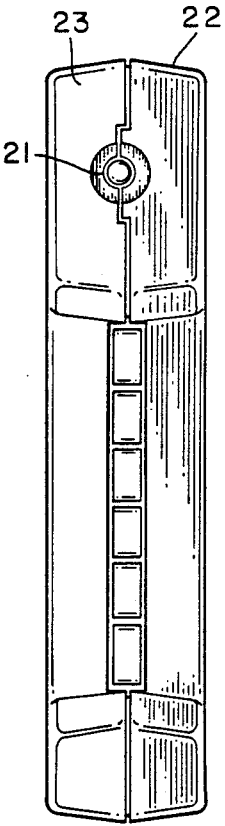
Figure 7:
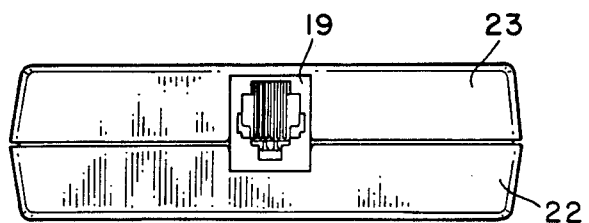

FIGS. 4-8 show various exterior, frontal views of the housing 11. As shown, the housing 11 is a two-part structure comprised of the top 22 and a bottom 23. FIGS. 6 and 8 are exterior side views and FIG. 4 is an exterior bottom view. Figs. 5 and 7 show respective end views. FIG. 4 also shows the removable battery cover 27 in its attached position on the housing 11.

The test device 10 structure described above is operable by utilizing the following procedures. The Termination Test procedure first involves setting the power Switch 51 to a non-depressed, OFF (open) position. On telephone systems with modular jacks, the incoming central office line is plugged directly into the modular jack 19. Otherwise, a cable set or the like is connected to the modular jack 19. The first terminal 58 is attached to the Tip conductor or side ($T_{co}$) of the central office line, and the second terminal 59 is attached to the Ring conductor ($R_{co}$), each via its corresponding clip or the like. On ground-start telephone trunks or installations, the third terminal 60 is attached to a local ground. Next, a termination switch 42 or 43 is depressed. The power switch 51 is then depressed to the ON (closed) position, whereupon the LCD display 18 displays the loop current. A minus sign on the display 18 indicates that a polarity reversal exists as to the line conductors. On ground-start telephone systems, the ground-start switch 62 is depressed to establish a temporary connection to ground and thereby receive a dial tone from the central office line.

The In-Line Test procedure first involves setting the power switch 51 to the OFF position. The first terminal 58 is connected to the Tip conductor ($T_{co}$) of the central office line and the second terminal 59 is connected to the Ring conductor ($R_{co}$) of the central office line. Additionally, the third terminal 60 is connected to the Tip conductor ($T_p$) of the premises equipment and the fourth terminal 61 is connected to the Ring conductor ($R_p$) of the premises equipment. The In-Line (second) and power switches 53 and 51 are depressed. The premises equipment is then operated "Off Hook" and the operating loop current is displayed on the LCD display 18.

High loop current detected via the above described procedure may be attenuated by inserting a current limiter, such as a resistance, in the loop. More precise control of loop current may be obtained by utilizing a variable resistance current limiter in conjunction with the Termination and In-line procedures. This is accomplished by first adjusting the resistance of the current limiter to limit loop current within an acceptable level after the Termination test. Then, the In-Line test is performed and the resistance may be readjusted should the current be outside the acceptable level during premises equipment operation.

The Tone Testing procedure first involves setting the power switch 51 to the ON position. The tone or first switch 52 is then depressed. The first and second terminals 58 and 59 are connected to a predetermined point on a pair of loop conductors. The same pair of conductors can be identified in a plurality of other conductors at a second predetermined point by checking conductor pairs with a standard telephone handset, for example, until the tone is detected. Further, faults may be located by checking the conductor pair at several points along a line until the absence of a tone signal is detected. Finally, a second tone signal of a differing frequency may be generated by connecting the third and fourth terminals 60 and 61 in the same manner as that described above, thereby allowing an additional line identification or fault detection test to be made simultaneously with the first test.

As many changes are possible to the embodiments of this invention utilizing the teachings thereof, the descriptions above and the accompanying drawings should be interpreted in the illustrative and not the limited sense.

That which is claimed is:

1. A compact test device for use with telephone line conductors which are connected to premises telephone equipment, comprising:

(a) a first test circuit for terminating the line conductors and for measuring current therein, said first test circuit establishing a current path between the conductors through circuit activation means, current measurement means, and resistance means, said current measurement means having display means;

(b) a second test circuit for measuring current in the line conductors in series with the premises equipment during operation, said second test circuit establishing a current path in series with the conductors and the premises equipment through said current measurement means and said circuit activation means; and (c) a third test circuit for providing a tone signal of a predetermined frequency to the line conductors, said third test circuit establishing a current path between the conductors through said circuit activation means, tone generation means, and a power source.

2. The test device of claim 1, wherein said current measurement means comprises a bridge circuit connected to said circuit activation means.

3. The test device of claim 2, wherein said display mean comprises said power source, an analog to digital converter connected to said bridge circuit and to said circuit activation means, and a liquid crystal display connected to said analog to digital converter and to said circuit activation means, said liquid crystal display visually indicating current level, polarity and test status.

4. The test device of claim 1, wherein said circuit activation means comprises a first switch, a second switch and at least one termination switch, said first switch, said second switch and said at least one termination switch being connected to said current measurement means.

5. The test device of claim 4, wherein said first test circuit establishes a current path through said first switch and said at least one termination switch, wherein said second test circuit establishes a current path through said first and said second switches, and wherein said third test path establishes a current path through said first switch.

6. The test device of claim 4, wherein said circuit activation means additionally comprises a four wire cable set having clip means for connection to the line conductors and to the premises equipment, said cable set being conductively linked to said first, second and at least one termination switches.

7. The test device of claim 4, wherein said resistance means comprises a pair of series connected resistors which are connected to said at least one termination witch so that said at least one termination switch varies the resistance value of said resistance means.

8. The test device of claim 1, wherein said first test circuit further establishes a current path through a circuit-breaker.

9. The test device of claim 1, wherein said tone generation means comprises a pair of tone generators, each said tone generator generating an oscillating tone of a predetermined frequency varying from said other tone generator.

10. The test device of claim 1, wherein said circuit activation means further comprises a ground-start switch, and wherein said first test circuit further and temporarily establishes a current path from one line conductor to ground, through said ground-start switch.

11. A unitary, compact and hand-held test device for use with telephone line conductors which are connected to the customer premises telephone equipment, comprising:
(a) a termination test circuit for terminating the line conductors at a point forward of the customer premises equipment and measuring current therein, said termination test circuit establishing a current path between the line conductors through variable resistance means, a current measuring bridge circuit, and first switch means, said bridge circuit being connected to LCD display means, said LC display means including a power switch and a battery;
(b) an in-line test circuit for measuring current in the line conductors in series with the customer premises equipment during operation, said in-Line test circuit establishing a current path in series with the line conductors and the customer premises equipment through second switch means, said first switch means, and said bridge circuit;
(c) a tone test circuit for providing an oscillating tone signal of a predetermined frequency to the line conductors, said tone test circuit establishing a current path between the line conductors through said first switch means, tone generation means, said power switch and said battery; and
(d) means to connect said termination test circuit, said in-line test circuit and said tone test circuit to the line conductors and the customer premises equipment.

12. A method of testing the current level on telecommunications interconnect line conductors which are connected to customer premises equipment, comprising the steps of:
(a) establishing a first test circuit between the line conductors through current test means to obtain a current level reading; and
(b) establishing a second test circuit in series with the line conductors and the customer premises equipment through said current test means to obtain a second current level reading.

13. The method of claim 12, further comprising the step of establishing a current path between the line conductors at a first predetermined point, through tone generation means, thereby generating a tone signal for reception at a second predetermined point.

14. The method of claim 13, further comprising the step of simultaneously establishing a second current path between the line conductors at a third predetermined point, through said tone generation means, thereby generating a second tone signal for reception at a fourth predetermined point.

15. The method of claim 12, further comprising the step of temporarily connecting one predetermined line conductor to ground.

16. The method of claim 12, further comprising the step of connecting a predetermined resistance in said first test circuit.

17. The method of claim 16, wherein said resistance is between 400 and 900 ohms.

18. The method of claim 12, additionally comprising the step of attenuating the current level on the line conductors subsequent to step a.

19. The method of claim 18, additionally comprising the step of adjusting the attenuation of the current level on the line conductors subsequent to step b.

20. A method of testing a telecommunications loop having pairs of line conductors which are connected to customer premises equipment, comprising the steps of:
(a) measuring loop current level from a terminated position by establishing a current path between two line conductors through a test circuit having current test means, display means, switch means, and resistance means;
(b) measuring loop current level in series with operative customer premises equipment by establishing a current path in series with the line conductors and the customer premises equipment through said current test means and said switch means; and
(c) generating a tone signal at a first predetermined point on the line conductors for reception at a second predetermined point on the line conductors by establishing a current path between the line conductors at said first predetermined point through said switch means, tone generation means, and a battery.

* * * * *